March 18, 1941.　　　G. L. CURRY ET AL　　　2,235,359
METHOD OF SEPARATING GLASS ARTICLES FROM A RIBBON OF GLASS
Filed April 14, 1939
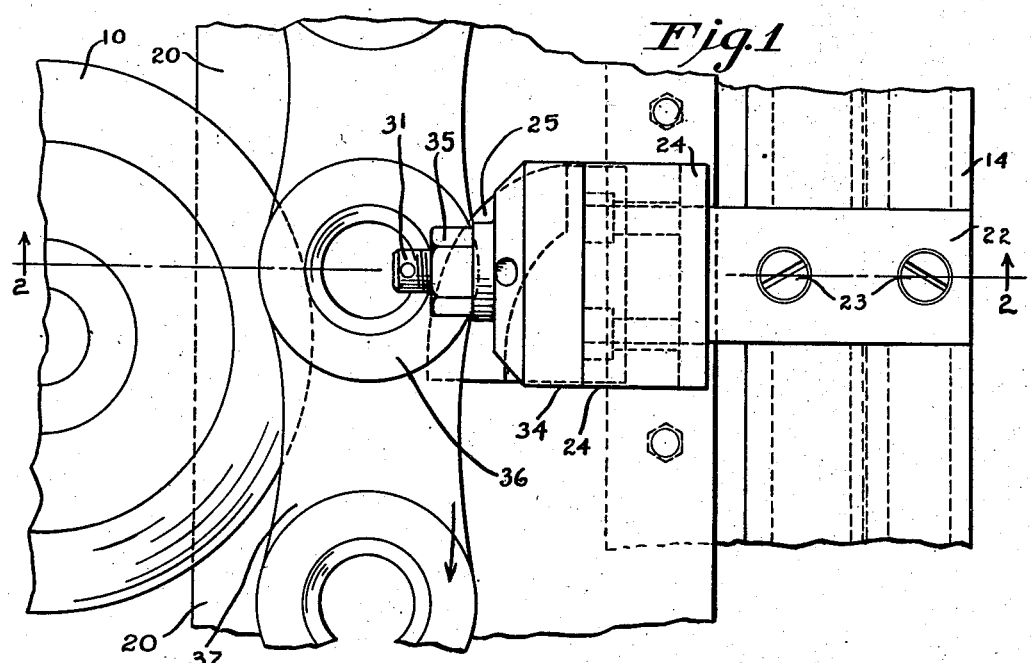
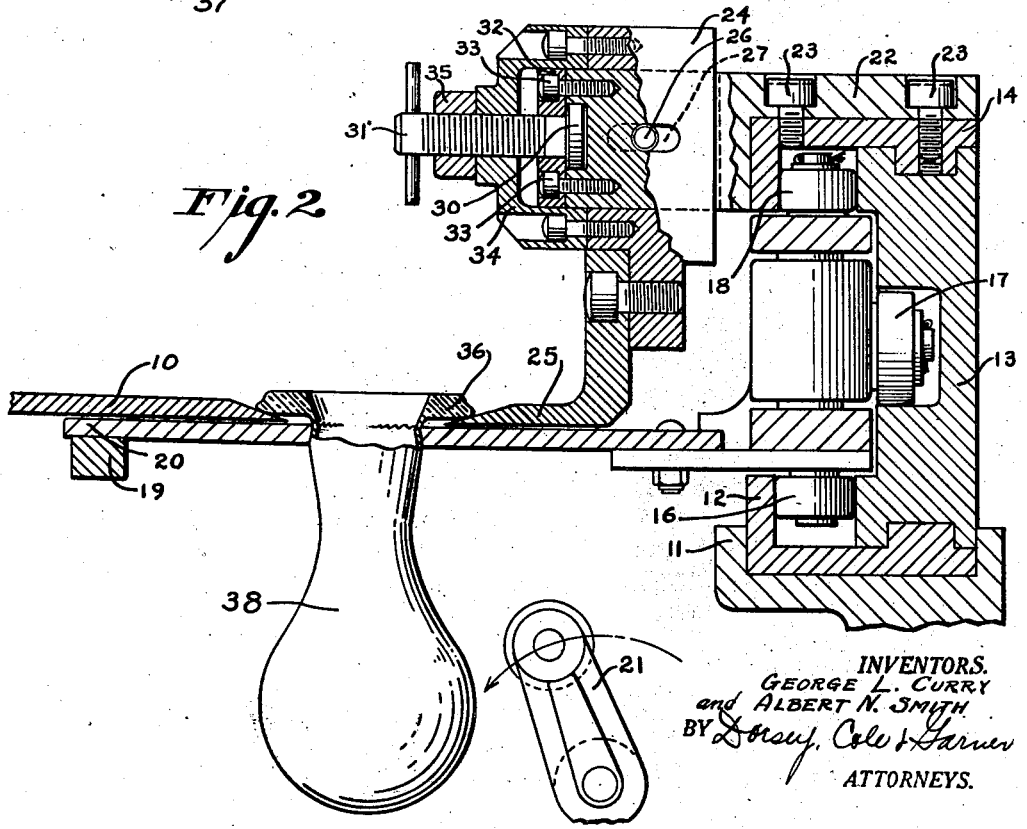
INVENTORS.
GEORGE L. CURRY
and ALBERT N. SMITH
BY
ATTORNEYS.

Patented Mar. 18, 1941

2,235,359

UNITED STATES PATENT OFFICE 2,235,359

METHOD OF SEPARATING GLASS ARTICLES FROM A RIBBON OF GLASS

George L. Curry, Pawtucket, R. I., and Albert N. Smith, Wellsboro, Pa., assignors to Corning Glass Works, Corning, N. Y., a corporation of New York Application April 14, 1939, Serial No. 267,902

2 Claims. (Cl. 49—77)

The present invention relates to glass working apparatus and particularly to a method of and apparatus for producing an even crack-off of articles from a plastic ribbon of glass from which they have been formed. The invention is especially adaptable to forms of machines such as disclosed in Woods et al. Patent 1,790,397 granted January 27, 1931, wherein in one form of the disclosure the ribbon is wholly stripped from the articles by a rotary disc or ribbon lifter referred to therein as a stripper mechanism, and the articles subsequently freed from their supports or orifice plates by engagement with a stationary crack-off bar. More recently the stationary crack-off bar has been replaced by a rotary crack-off mechanism such as that disclosed in Patent 2,091,494 granted August 31, 1937, to Harold Snyder, and having its operation timed to occur just after the crack-off has been initiated by the rotary ribbon lifter. By this method of operation the rotary crack-off mechanism has been depended upon to initiate a break between the ribbon and an article at a point opposite the break by the rotary ribbon lifter and further to completely separate the article from the ribbon and its support. This latter combination of parts and method of operation has proven quite successful, but the percentage of defective ware traced to uneven crack-off has been somewhat excessive. This has been attributed to the fact that the crack-off arm strikes the article at a point remote from that at which it is desired to initiate the crack-off. Because of this, in many instances the crack-off so initiated has a point of origin below that initiated by the rotary ribbon lifter and travels downward into the neck of the article, rendering the article defective.

A prime object of the present invention is an improved method of and apparatus for effecting the crack-off of ware.

Other objects and features of the invention may be gathered from a further study of the specification and the accompanying drawing illustrating the invention applied to the general type of machine disclosed in the above referred to Woods et al. patent.

In the drawing,

Fig. 1 is a plan view of a fragment of a glass working machine to which the invention is applied, and Fig. 2 is a side elevation on line 2—2 of Fig. 1.

In the drawing, the parts of an existing glass working machine to which the invention is applied includes an upright support 11, track rails 12, 13, and 14, and orifice plates 20 supported from links of a chain having rollers 16, 17, and 18 associated with the track rails. Also forming a part of the existing machine is a further support 19 for the free ends of orifice plates 20, and a rotatably mounted disc or ribbon lifter 10 similar to the stripper mechanism disclosed in the Woods et al. patent. The numeral 21 designates an arm of a crack-off mechanism similar to that disclosed in the Snyder patent.

Applicants' contribution to the machine comprises a mechanism carried by a base 22 clamped to the track rail 14 by means of screws 23. The free end of base 22 extends transversally over the path of movement of orifice plates 20 and has slidably mounted thereon a support 24 to which is fixed a stationary ribbon lifter 25. Rotary movement of support 24 is ordinarily prevented by a shear pin 26 which passes through an elongated aperture 27 in this support, and which will shear and allow rotary movement of the ribbon lifter 25 without damage to the machine should an orifice plate get out of alignment and encounter the ribbon lifter.

It is common practice to manufacture different sizes of ware on machines of the type illustrated, necessitating the use of orifice plates having orifices of different diameter. Because of this provision is made for laterally shifting the ribbon lifters. The provisions made for shifting the rotary ribbon lifter does not constitute a part of the present invention and therefore has not been illustrated. In order to shift ribbon lifter 25 the free end of support 24 is recessed to accommodate the flanged portion 30 of an adjusting screw 31 which is rotatably held in place by a suitable plate 32 and associated screws 33. The adjusting screw 31 is threaded through a cap plate 34 fixed to the ribbon lifter support 24 and is also threaded through a lock nut 35. As will be evident, desired lateral adjustment of the ribbon lifter 25 may be readily made by turning of screw 31 and then tightening the lock nut 35 to positively retain the adjustment.

In the operation of the machine, as an article carrying section 36 of a ribbon 37 rides over the rotary and stationary ribbon lifters 10 and 25, simultaneous crack-off of each of the articles, such as 38 suspended from the ribbon, is initiated from opposite sides thereof, thereby positively initiating both breaks in the same plane. As illustrated in Fig. 2, the crack-off arm 21 at almost the same instant strikes the article and completes the crack-off operation.

What is claimed is:

1. The method of separating glass articles from a ribbon of glass from which they have been formed, which includes exerting a lifting force simultaneously on opposite sides of the ribbon and holding the articles against elevation with the ribbon.

2. The method of separating glass articles from a moving ribbon of glass from which they have been formed, which includes exerting a lifting force simultaneously on opposite sides of the ribbon at a predetermined point in its travel, holding the articles against elevation with the ribbon and striking the articles as the ribbon is being lifted.

GEORGE L. CURRY.
ALBERT N. SMITH.